US012668434B2

(12) United States Patent
Larsen

(10) Patent No.: US 12,668,434 B2
(45) Date of Patent: Jun. 30, 2026

(54) PLATE ALIGNER

(71) Applicant: GRAM EQUIPMENT A/S, Kolding (DK)

(72) Inventor: Jan Kjær Larsen, Sdr. Stenderup (DK)

(73) Assignee: GRAM EQUIPMENT A/S, Kolding (DK)

( * ) Notice: Subject to any disclaimer, the term of this patent is extended or adjusted under 35 U.S.C. 154(b) by 75 days.

(21) Appl. No.: 18/278,448

(22) PCT Filed: Mar. 4, 2022

(86) PCT No.: PCT/DK2022/050036
§ 371 (c)(1),
(2) Date: Aug. 23, 2023

(87) PCT Pub. No.: WO2022/184220
PCT Pub. Date: Sep. 9, 2022

(65) Prior Publication Data
US 2024/0132300 A1     Apr. 25, 2024
US 2024/0228186 A9     Jul. 11, 2024

(30) Foreign Application Priority Data

Mar. 5, 2021     (DK) ............................ PA 2021 70097

(51) Int. Cl.
*B65G 47/28*     (2006.01)
(52) U.S. Cl.
CPC ........ *B65G 47/28* (2013.01); *B65G 2201/022* (2013.01)
(58) Field of Classification Search
None
See application file for complete search history.

(56) References Cited

U.S. PATENT DOCUMENTS 3,642,117 A * 2/1972 Burt ........................ B65G 13/00
209/583
4,049,500 A 9/1977 Kamm
(Continued)

FOREIGN PATENT DOCUMENTS

CH         695 561 A5     6/2006
CN     111 532 730 A     8/2020
(Continued)

OTHER PUBLICATIONS

Danish Search Report for Application No. PA 2021 70097, completed on Sep. 15, 2021.
(Continued)

*Primary Examiner* — Kavel Singh
(74) *Attorney, Agent, or Firm* — CANTOR COLBURN LLP

(57)          ABSTRACT

A method and arrangement for aligning plates is provided. The plates are arranged substantially end to end and have a first and second side, the sides being parallel and arranged on opposite sides, and a front and rear side, where the sides delimit a plate area. During transport, the rear side of a first plate is adjacent the front side of a subsequent plate. The plates have a propelling means along the first side for engaging and propelling the plates and an aligner arranged along the second sides, where the aligner, is moved orthogonal to from a first position where the aligner is not in contact with the plates to a second position where the aligner is in contact with at least two adjacent plates, and the contact aligns the second sides of adjacent plates, such that the plates are arranged with the second sides along a straight line.

17 Claims, 4 Drawing Sheets

(56)        References Cited

U.S. PATENT DOCUMENTS

| | | | |
|---|---|---|---|
| 4,489,821 A | | 12/1984 | Inaba et al. |
| 4,624,637 A | | 11/1986 | Genesio et al. |
| 4,836,354 A | | 6/1989 | Motoda |
| 4,976,766 A | * | 12/1990 | Kuster .................... C03B 35/14 |
| | | | 65/289 |
| 5,007,527 A | | 4/1991 | Ach et al. |
| 5,143,195 A | | 9/1992 | Bloecker |

FOREIGN PATENT DOCUMENTS

| | | | | |
|---|---|---|---|---|
| CN | 211 544 781 U | | 9/2020 | |
| CN | 111 923 575 A | | 11/2020 | |
| CN | 112 173 549 A | | 1/2021 | |
| DE | 38 32 845 C1 | | 7/1989 | |
| EP | 1 401 611 A1 | | 3/2004 | |
| GB | 2214479 A | | 9/1989 | |
| JP | 61226415 A | * | 10/1986 | |
| JP | S61 226415 A | | 10/1986 | |
| SU | 975514 A1 | | 11/1982 | |
| WO | 03/004215 A1 | | 1/2003 | |

OTHER PUBLICATIONS

International Search Report & Written Opinion for PCT/DK2022/
050036 mailed Jun. 3, 2022.

\* cited by examiner

PLATE ALIGNER

CROSS-REFERENCE TO RELATED APPLICATIONS

This application claims priority to PCT Application No. PCT/DK2022/050036, having a filing date of Mar. 4, 2022, which is based on DK Application No. PA 2021 70097, having a filing date of Mar. 5, 2021, the entire contents both of which are hereby incorporated by reference.

FIELD OF TECHNOLOGY

The following is directed to an arrangement for aligning plates in an array of plates being transported along a transport path as well as a plate aligner and a method of using such an arrangement including a plate aligner.

BACKGROUND

In many production lines the products, which have been manufactured, are often transported along conveying parts from one process to another process or even through processing of the products being manufactured or handled.

In many types of production, the products are transported by trays or plates or the like from one process station to a further process station and in order to be able to carry out treatments or processing steps along the conveying part, it is necessary to know the exact position of the products relative to the treatment device. Examples of such production lines may be in the food industry where for example bread or cakes shall be provided with a topping and in order not to have the topping being wasted on the plate itself causing both waste of topping and undesirable and potentially unhygienic pollution of the production line, it is desirable to be able to know the exact position of the bread or cake, when it is passing the part of the production line where the topping is being added. In the same category, for example when manufacturing ice cream cones, it is desirable to know the exact position of the ice cream cone in order to be able to, for example spray a chocolate coating on the cone, place the ice cream inside the cone and provide any topping or coating to the finished ice cream cone. The more topping, which is not correctly placed on the product as intended, is considered an unnecessary waste and an additional non-productive cost and furthermore, additional costs are created in that the cleaning of the plates or trays in which the products are being transported needs to be very thorough due to the pollution caused by the topping or additive not being correctly placed on the intended item. Furthermore, if for example the chocolate decoration is slightly off-set the overall presentation of the finished product may be imperfect, and therefore of lesser quality.

In U.S. Pat. No. 4,049,500 is disclosed a system where work pieces are positioned on trays, which trays are transported along a transport path. In order to be able to perform precise operations/work on the workpieces, the trays are provided with apertures. At a desired position where the work pieces are to be processed, an elevator having a number of spikes is elevated under the trays, whereby the spikes engage the holes and in this manner precisely determines the position of the tray and thereby the workpiece. In the elevated position, where the tray is lifted from the conveying structure, and held by the elevator, work is performed on the workpiece. As the spikes are cone shaped a high degree of precise positioning of the tray is accomplished. On the other hand, the tray is removed from the transport path, and the forwards conveyance of work pieces is halted while the elevated tray is being treated at the workstation.

SUMMARY

An aspect relates to aligning the position of the plates/trays in a production line to such an extent that at least immediately prior to and during a process treatment in a conveyor line, the trays/plates are positioned precisely on the conveyor in order to be able to carry out the treatment on products placed on the conveyor in as a precise manner as possible. Furthermore, there is a desire to provide an arrangement allowing for batchwise or continuous production, with a high degree of precise positioning.

In order to improve the position of plates or trays on a conveyor belt, embodiments of the present invention provide an arrangement for aligning plates in an array of plates being transported along a transport path in a substantially horizontal plane, the plates having a first side and a second side, the sides being parallel and arranged on opposite sides of the plate, and a front side and a rear side, where the sides delimit a plate area, and when an array of such plates is being transported along the transport path, the rear side of a first plate is adjacent the front side of a subsequent plate, where the arrangement comprises:

a propelling means along the first side for engaging and propelling the plates along the transport path;

an aligner arranged along the second side of at least one or part of one plate in the array of plates, where the aligner or a part of the aligner may be moved relative to the transport path from a first position where the aligner is not in contact with the plates to a second position where the aligner is in contact with at least one or part of one side of the plate in the array of plates, where the plates when being aligned remains in the substantially horizontal plane of the transport path.

Within the scope of embodiments of the invention, the term plates shall be construed as meaning any type of member having a surface on which products are placed in or on. Consequently, the plates need not be absolutely two-dimensional but may be provided with shallows, apertures or side limitations, as will be clearly understood by persons skilled in the conventional art from the presentation of embodiments of the invention.

Furthermore, the term "substantially even plane" shall be understood as the plates are travelling along a transport path, which path within acceptable tolerances is following an even path. Typically, the even path will be in a horizontal plane.

Above, the plates are provided with first and second sides, as well as front and rear sides. This shall be understood as both a physical feature and as a geometrical feature. Consequently, the side may be considered as an edge only having the material thickness of the plate as its dimension opposite to the plane of the plate or it may be provided with an upstanding or downwards folded side having a geometrical extend larger than the material thickness of the plate material orthogonal to the plane of the plate.

Many of the conveyor structures, where embodiments of the invention may be utilized, has means to propel the plates either along a first side or underneath the plate itself. The plates are typically propelled on the conveyor along a transport path i.e., from an upstream position to a downstream position and where the further processing of products carried on the plates is carried out between the upstream and downstream positions.

Typically, it is an object not to interfere too much or at all with the transport on the conveyor means both in order not to misalign objects being transported but also to avoid creating unnecessary resistance during their transport. Embodiments of the invention therefore provides an aligner, which may be moved relative/orthogonal to the transport path, such that the aligner may be brought into contact with the sides of the plates only in the desired position, where the precise further processing or treatment of the products being carried out on the plates is to be carried out. Therefore, as little interference as possible with the plates being transported along the linear transport path is provided.

As the engagement between the aligner and the plate in a first embodiment is only foreseen as being in one point of contact or very few points of contact, very little interference is created. At the same time, as the aligner is typically mounted on the conveyor sub-structure as such it will be mounted in a fixed position relative to any device arranged at that position on the conveyor belt/transport path. The devices will typically dispense some type of treatment on or to objects carried on the plates. As the conveyor structure is fixed, the aligners position will be fixed, which means that should a plate unintentionally have moved on the conveyor, the aligner will push the plate back into line, whereby precise treatment of the objects by the devices will be achieved.

Furthermore, in embodiments where the aligner engages at least two adjacent plates the linearity of the engagement part of the aligner will assure that the sides being engaged on two plates are perfectly aligned such that a clear reference line is provided with reference to guiding of the device carrying out the processing of the products, as they are passing along the transport path. For example, as will be explained below with reference to a particular example, the alignment of the plates assures that the products placed on the plates are in an exact predefined position, when the treatment takes place. This may be important for example when treating ice cream cones with the coating on top of the rim of the cone, as it is desirable not to spray the treatment, for example melted chocolate past the cone and onto the plate, but to place as much chocolate coating as possible in the correct position relative to the cone.

As may be understood from the above description of the inventive concept, the plates remain on the conveyor, constituting the conveyor path throughout the alignment process. This has the further advantage that the plates and thereby the products being carried on the plates are not disturbed by the plates being handled apart from the slight correction initiated by the aligner.

Likewise, as the plates remain on the conveyor, it is not the aligner which dictates the production. As the aligner may continuously align adjacent plates, it is the type of treatment carried out to the products/objects and the machinery carrying out this treatment which dictates the movement of the plates along the transport path. In some processes it may be stepwise whereas in other processes it may be continuous.

In a further embodiment of the invention, the aligner is arranged on a movable structure, which structure may move in the direction of the transport path from a first aligner position to a second aligner position, and where an actuator is provided for moving the aligner relative/orthogonal to the transport path, from the first aligner position to the second aligner position and back again.

With this arrangement the aligner moves together with the plates downstream on the transport path. It is therefore possible to create a substantially continuous transport velocity of the plates on the conveyor and at the same time activate the aligner in order to achieve precise alignment of the plates relative to the treatment devices disposed in or along the conveying part.

In a further embodiment, the propelling means may move the plates stepwise/sequentially or continuously. Naturally, it is also possible to have a stepwise or sequential movement, which in some applications is very desirable in that the treatment to which the products are being exposed at that particular station may have a duration, which requires the products to be treated to be at a standstill or substantially standstill on the conveying part in order to be able to carry out the intended treatment. This may also simplify the construction of the process apparatus as the device which shall carry out treatment does not need to be movable.

In a further embodiment of the invention, the second side of the plates, is provided with at least one indentation arranged a determined distance from the front side of the plate, and where the aligner is provided with at least one protuberance congruent to the at least one indentation or where the second side is provided with indentations evenly spaced with a mutual fixed distance X along the second side, and where the aligner is provided with protuberances congruent to the indentations and mutually spaced the same distance X. As the aligner, provided with protuberances having the same relative distance as the indentations on the sides of the plates, is brought into engagement with the side of the plates, the indentations and protuberances will intermesh.

Thereby in embodiments where one protuberance engages one indentation on one plate, that particular plate will be brought into perfect alignment, corresponding to the theoretical position of the plate with respect to any device superposed to dispense treatment to objects on that particular plate. In embodiments where the aligner spans more than one plate, the plates will be firmly held relative to each other and should there be an uneven spacing i.e., gap between the adjacent plates the indentations and protrusions will, during the introduction of the aligner into the indentations slide the misaligned plate into the correct position. With this feature it is assured that even slight deviations in gaps between adjacent plates are corrected such that as the aligner is engaged and at least at a certain period after the engagement i.e., after the aligner has been brought out of engagement with the realigned plates the gap between adjacent plates is exactly as determined i.e., corresponding to the distance between adjacent protuberances/indentations. Naturally, the plates may be provided with protuberances and the aligner provided with the indentations.

In a further embodiment, the protuberances in the plate are semi-circles, triangles, rectangles, polygonal.

These various geometric shapes all provide for a possibility of the protuberance, for example being a semi-circle and the indentation being a semi-circle are engaged in such a manner that if there is a slight misalignment the engagement by the side of the semi-circle of the protuberance will lightly push/displace the plate with the indentation in order for the aligner to be able to introduce the protuberance fully into the indentations, whereby a safe and determined position is achieved between two adjacent plates.

Embodiments of the invention foresee that the second side of the plate and distanced from the second side is provided with apertures having a mutual distance Y in the direction of the transport path, the apertures being provided in the plate area, and where the aligner has a web extending below the plates in the transport path, where the web is provided with spikes spaced a distance Y in the transport paths direction, the spikes extending upwards towards the plates, and where the aligner with the web may be moved such that the spikes penetrates the apertures on two adjacent plates.

In this embodiment the sides of the plates may be completely straight without any protuberances or indentations, whereas adjacent the side an array of apertures is provided such that spikes provided on the aligner will be able to be moved upwards through the apertures thereby in the same manner as described above aligning the adjacent plates, as the aligner will engage at least the two plates for each alignment movement.

In a further embodiment, a mechanical return mechanism is provided in order to assure that the aligner is moved away from the second side, allowing the plate to travel along the transport path, the mechanical return mechanism comprising one or more surfaces orthogonal to the plane of the plates and arranged at an oblique angle relative to the direction of the transport path, where the closest part of the oblique surface is upstream relative to the transport path, and one or more engagement pegs extending such that they engage the oblique surface, such that when the aligner moves in the direction of the transport path, at least one engagement peg will engage one oblique surfaces whereby the aligner is urged away from the second side.

When the aligner engages the sides of the plates it may be important in embodiments to ensure that the aligner also releases the plates again in order to have free movement along the transport path by the conveyor. During normal operation it is assured by actuators moving the aligner back and forth orthogonal to the transport direction, that the aligner is both engaging and disengaging the second sides of the plates, but should one or more of these actuators fail, embodiments of the invention provide a mechanical return mechanism, such that as the aligner moves in the transport direction together with the plates, which have been aligned at the end of the movement cycle for the aligner, an oblique surface will engage an engagement peg, which will force the oblique surface to move laterally relative to the engagement peg. When the engagement peg or the oblique surface is mounted on the aligner the forward movement will cause the aligner to be moved away from the plates due to the mechanical engagement between the engagement peg and the oblique surface. This mechanical movement can be assured by only activating the actuators intended to move the aligner towards the plates, and not have any engagement when withdrawing the aligner from engagement with the plates and as such there is no power on the other actuators intended to move the aligner towards the plates. In some examples of embodiments of the invention, the actuators use to move the aligner from a not engaged position to an engaged position with the side of the plate are air cylinders and as such by simply cutting off the air supply it is relatively small forces, which are needed to be exerted by the mechanical return mechanism in order to force the aligner out of engagement with the side of the plates.

Embodiments of the invention are also directed to a method of aligning plates being transported along a transport path, where the plates are arranged substantially end to end, where the plates has a first side and a second side, the sides being parallel and arranged on opposite sides of the plate, and a front side and a rear side, where the sides delimit a plate area, and when an array of such plates is being transported along the transport path, the rear side of a first plate is adjacent the front side of a subsequent plate, and a propelling means along the first side for engaging and propelling the plates along the transport path, and where an aligner is arranged along a distance corresponding to at least one or a part of one plate in the array along the second sides of the plates, where the aligner, when plates are being transported along the transport path, is moved relative to the transport path from a first position where the aligner is not in contact with the plates to a second position where the aligner is in contact with at least one or part of one plate, and where the contact will align the second sides of at least one plate, such that the plate is aligned relative to a fixed line.

In this connection the fixed line shall be understood as an imaginary line along which the production devices are arranged. For example, when treating ice cream cones as mentioned above it may be important that the devices dispensing treatment to the cones, for example chocolate covering are precisely positioned relative to the cone when dispensing, such that the dispensed material arrives at its intended place (the cone) and not on the plate. For this reason, the treatment device is arranged at a fixed position and consequently the aligner is arranged such that it will position the plates correctly and precisely relative to this fixed (imaginary) line.

It is clear that this method obtains the advantages already described above with reference to the arrangement itself.

BRIEF DESCRIPTION

Some of the embodiments will be described in detail, with references to the following Figures, wherein like designations denote like members, wherein.

Figures 4, 5, 6:
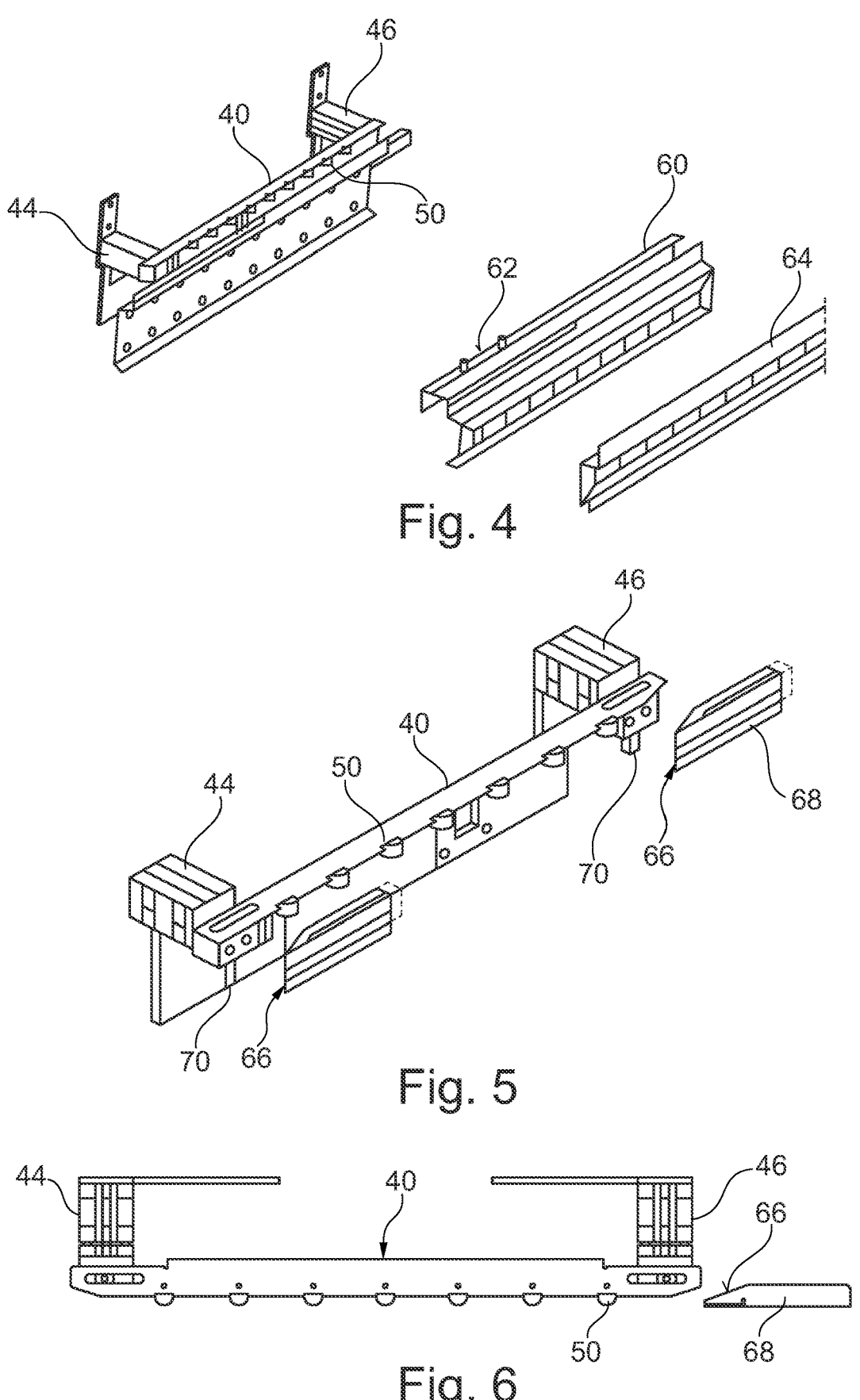
FIG. 4 illustrates a more detailed view of the construction where the aligner is arranged connected to two actuators.
FIG. 5 illustrates a mechanical return mechanism.
Figure 7:
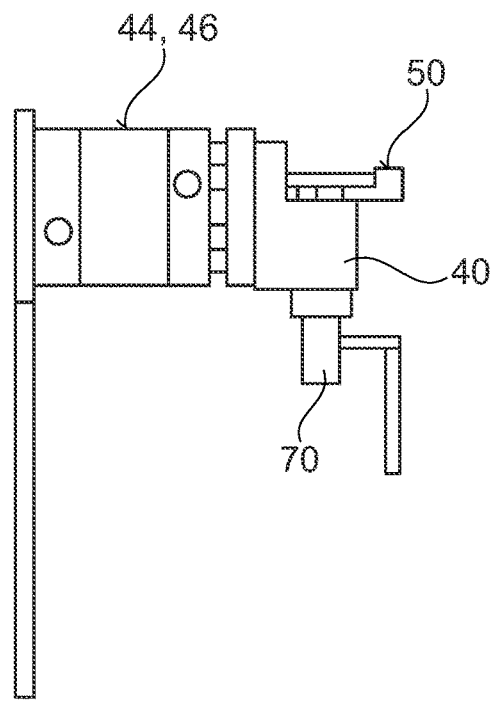
Figure 8:
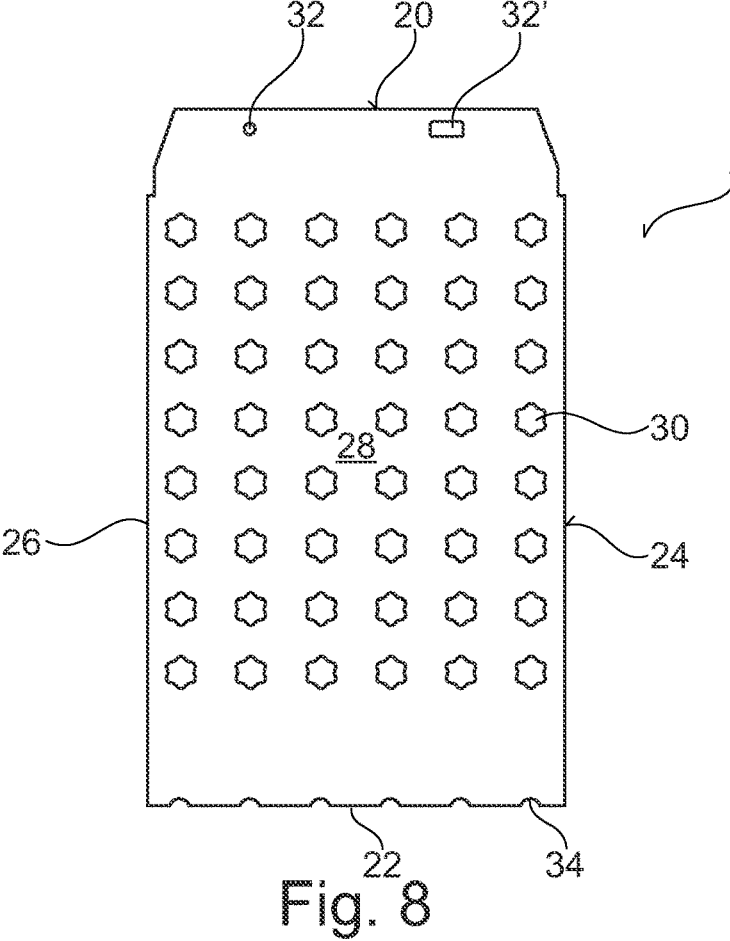
Figure 9A:
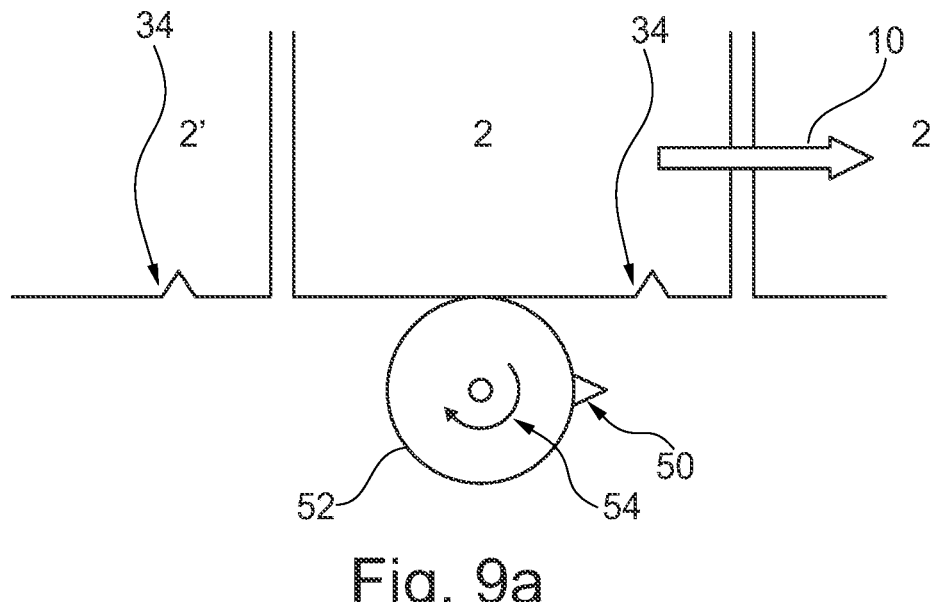

FIG. 6 the same construction as illustrated in FIG. 5 from above;

FIG. 7 illustrates a vertical cross section through the aligner illustrating an engagement peg;

FIG. 8 illustrates a plane view of a plate usable with embodiments of the invention;

FIG. 9a illustrates alternative embodiments of aligner engagements; and

Figure 9B:
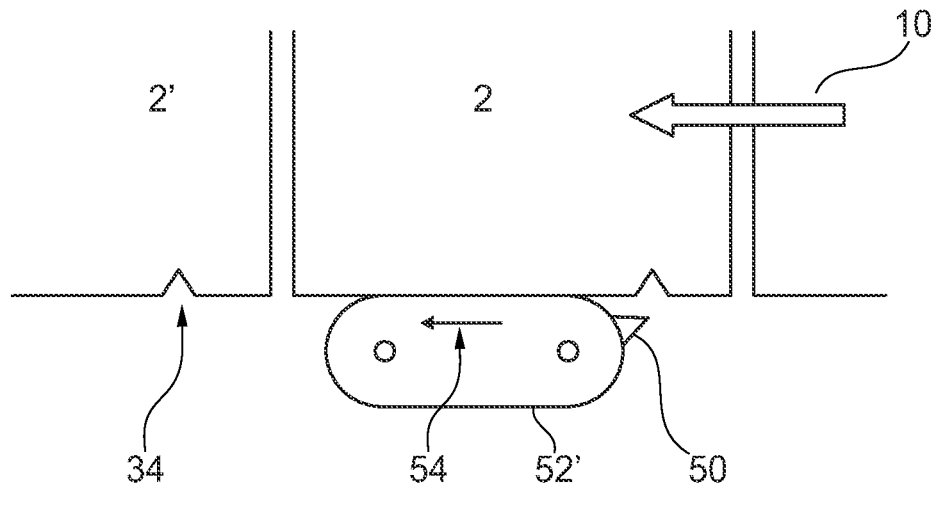

FIG. 9b illustrates alternative embodiments of aligner engagements.

DETAILED DESCRIPTION

Figures 1, 2, 3:
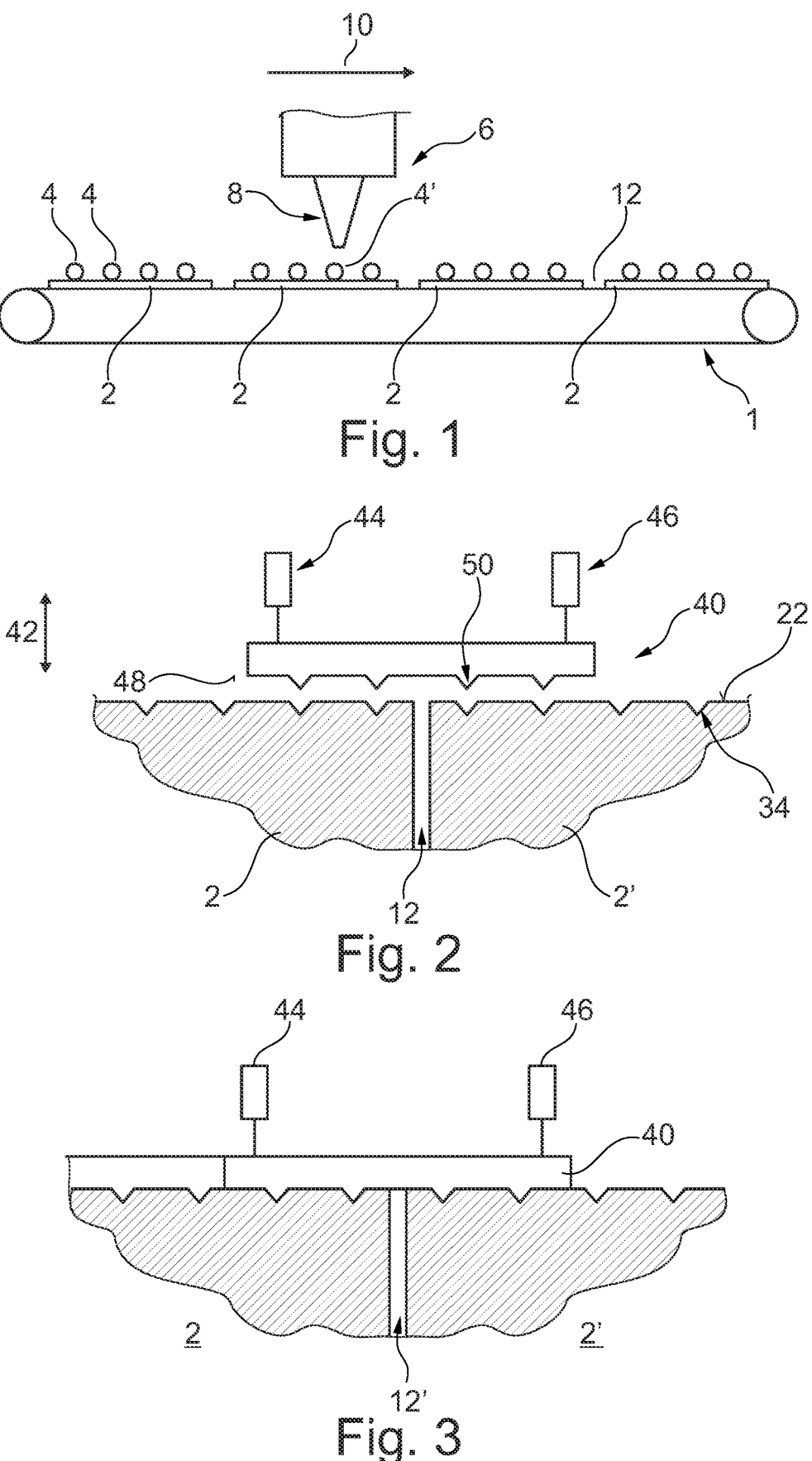
FIG. 1 illustrates part of a production line comprising a conveyor structure.
FIG. 2 illustrates the plater aligner in a schematic manner.
FIG. 3 illustrates the plater aligner in a schematic manner.

In FIG. 1 a part of a production line comprising a conveyor structure 1 is very schematically illustrated. On a conveyor structure an array of plates 2 is conveyed along a transport path, and on each plate 2 is arranged a number of products 4. Arranged above the conveyor structure 1 a dispenser 6 is positioned, which is positioned such that it during operation will dispense for example an ingredient onto a product 4' positioned under a nozzle 8 of the dispenser 6. In order for the ingredient dispensed by the nozzle 8 to be correctly placed on the product 4' and not on the tray 2 as such, it may be important in embodiments that the plate 2 on which the products 4 are being transported along the transport path, where the transport direction is indicated by the arrow 10 are positioned in well-defined positions relative to the nozzle 8. As illustrated, each plate 2 in the rear of the plate is distanced from an adjacent plate 2 by a gap 12. Due to the plates 2 being substantially loose relative to the conveying structure 1, it is possible that the gap 12 between adjacent plates 2 may vary considerably and furthermore that the plates 2 may be positioned askew relative to an adjacent plate such that the gap varies between adjacent plates and also laterally across the conveying structure 1. This may lead to the dispenser 6 and particularly the nozzle 8 not being correctly positioned relative to the product 4', which it is intended to treat and as such all or part of the dispense material from the nozzle 8 may miss the intended product 4' and instead be dispensed on the plate 2, as such. In addition to being a waste of ingredient this also pollutes the plates 2 and requires an extra hygienic effort in order to keep the plates 2 clean. This may be particularly an important aspect in food production manufacturing lines.

By making sure that the gap 12 is consistent, it is possible to with a much higher degree of precision to arrange the product 4', which is to be treated for by example dispenser 8. To this end, embodiments of the invention implement the plater aligner, as already discussed above. The plater aligner is illustrated in FIGS. 2 and 3 in a very schematic manner in order illustrate the function of the plater liner.

Turning briefly to FIG. 8 a plane view of an example of a plate 2 usable with embodiments of the invention are illustrated. The plate is defined by a first side 20 and a second side 22. These sides are parallel and arranged on opposite sides of the plate. Additionally, there is provided a front side 24 and a rear side 26. Together these sides 20, 22, 24, 26 delimit a plate area 28. In this particular embodiment a substantial part of the plate area 28 is provided with apertures 30, which apertures are suitable to receive and hold the product which is being treated during the passage on the conveying line, illustrated in FIG. 1. In this example the plate is particularly suitable for holding cones for ice cream in an upright position.

Along the first side 20 two apertures 32, 32' are provided, which in use will be engaged by a drive chain in the conveying structure 1 in order to propel the plate 2 along the conveying path. On the second side 22 a number of indentations 34 is provided. In this embodiment the indentations 34 have geometrical shape of semi-circles but as will be apparent from for example FIGS. 2 and 3 the indentations may also have a triangular shape. Any geometrical shape may be found to be suitable for these indentations and corresponding/congruent protuberances as will be explained below. The indentations 34 are spaced equidistantly along the second side as such that the indentations adjacent the front and rear sides 24, 26 of the plate 2 have a distance to the front and rear sides, respectfully, of a less than half the distance between two adjacent indentations in the second side 22 as such. This distance being less than half the distance between two indentations is due to the fact that when two plates are arranged in an array with a gap between the indentations on the adjacent plate should be spaced such that as the aligner interfaces with the indentations a fixed gap space should be provided. The gap is defined by the difference in distance between two adjacent indentations in one plate and the outermost indentations distance to the rear, respectively, front sides 24, 26.

Turning back to FIGS. 2 and 3 the aligner 40 is arranged for lateral movement indicated by the arrow 42, where the lateral movement is with respect to the intended travel direction of the conveyor, as indicated with arrow 10 in FIG. 1. The aligner 40 is connected to two actuators 44, 46 such that by activating the actuators 44, 46 the aligner may be brought from a disengaged position, as illustrated in FIG. 2, into an engaged position, as illustrated with FIG. 3. The front side 48 of the aligner 40 is provided with protuberances 50. In this embodiment the protuberances 50 are in the shape of triangles extending from the front surface 48 of the aligner 40. Correspondingly, the second side 22 of the plates 2, 2' is provided with indentations 34 which in this embodiment are in shape of congruent triangles such they are able to receive the triangular shape of the protuberances 50 provided on the front side 48 of the aligner 40.

The plates 2, 2' are arranged with a gap 12 between them and as explained with reference to FIG. 1, in embodiments it may be important that the gap between two adjacent plates is completely well defined in order to arrange the object 4' to be treated in the production line for example by the dispenser 6 is in the absolute correct position. By activating the actuators 44, 46 as illustrated with reference to FIG. 3 the aligner 40 will move laterally whereby the protuberances 50 will engage the indentations 34 and in this manner lock the adjacent plates 2, 2' in a spaced relationship thereby creating a well-defined gap 12' between adjacent plates.

Due to the design of the protuberances and the indentations it is clear that should one plate for example plate 2' be misaligned relatively to plate 2, the oblique angles provided on the protuberances and indentations will cause a realignment whereby the well-defined gap 12' is assured.

As indicated in the FIG. 1 the plates are being conveyed along a transport path by the conveying structure 1. Therefore, in embodiments, it may be necessary for the aligner 40 to be able to safely disengage the plates by being withdrawn laterally as indicated by the arrow 42 back to the position illustrated in FIG. 2. In this position the plates are able to travel along the transport path. Consequently, the aligner may either be stationary and move back and forth as described with reference to FIGS. 2 and 3 while at the same time the conveying structure 1 advances sequentially i.e. in steps or the aligner may be moved on a traveling structure such that the aligner can travel for a distance along the transport path long enough for the treatment of the products 4' to be carried on the conveyor and the plates after which the aligner will disengage, move back to the first upstream gap and realign the plates and thereafter move together with the plates along the transport path. In this manner it is possible to have a continuous movement of the plates 2 on the conveyor as described above with reference to FIG. 1.

In FIG. 4 is illustrated a more detailed view of the construction where the aligner 40 is arranged connected to two actuators 44, 46 such that the aligner 40 may move back and forth as illustrated with reference to FIGS. 2 and 3. The aligner is provided with protuberances in the shape of semicircle protuberances 50. On the opposite side to the aligner 40 is provided a propulsion means in the shape of a guide way 60 in which a chain 62 (only a short bit of a chain is illustrated) may travel. The chain 62 will engage and propel the plates 2 along the conveying path. Finally, a support rail 64 for supporting the first side of the plates is provided. The construction illustrated in FIG. 4 may illustrate a short section of the conveying structure 1 illustrated with reference to FIG. 1.

Turning to FIG. 5 a mechanical return mechanism is illustrated. In this embodiment the mechanical return blocking device comprises an oblique surface 66 mounted on a member 68. The aligner 40 is similar to the aligner described above with reference to FIG. 4 in that aligner 40 is being activated by two actuators 44, 46 in order to bring the protuberances on the aligner 40 into and out of engagement with the corresponding indentations on the second side of the plates.

In embodiments as described above where the aligner together with the actuators etc. moves along the transport path, it may be important that the protuberances 50 are disengaged from the indentations at the correct position in order to allow the plates to continue on their transport path.

For this purpose, an engagement peg 70 is provided on the aligner. The members 68 with the oblique surfaces 66 are fixedly mounted on the conveying structure 1 and as the aligner 40 moves along the transport path, the engagement peg 70 will at a certain position engage the oblique surface 66 such that the aligner 40 is pushed laterally away from the plates (not illustrated) travelling on the conveying structure. In order to assure a linear lateral movement of the aligner 40, a second peg and oblique surface is provided in the other end of the aligner such that a substantially even pushing force is achieved as the engagement peg 70 engages the oblique surfaces 66.

In FIG. 6, the same construction is illustrated from above where the same features are provided with the same reference numbers.

Likewise, in FIG. 7, the vertical cross section through the aligner illustrating the engagement peg 70 is illustrated. And again, the same features are provided with the same reference numbers.

In FIGS. 9a and 9b are schematically illustrated alternative embodiments of aligners and their engagement with the plates. The same reference numbers are reused as from the figures above.

In FIG. 9a the aligner comprises and engagement part 52 in the shape of a wheel. The wheel is brought to rotate in the direction indicated by the arrow 54. The rotation velocity of the wheel 52 is set such that the protuberance 50 will engage the indentation in a determined position. If the plate 2, and thereby the indentation 34 is not in the expected correct position, the protuberance 50, will engage the indentation and any off-set will thereby be corrected by pushing/urging the plate 2 into its correct alignment.

The same principle applies to the sketched embodiment in FIG. 9b, where the wheel 52 is replaced by an endless belt 52', but otherwise the principle is the same. The belt 52' will travel with a velocity in the direction 54 such that the protuberance 50 will engage the indentations in predetermined positions and correct the plates position by this engagement.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An arrangement for aligning plates in an array of plates being transported along a transport path in a substantially horizontal plane, the plates having a first side and a second side, said the first side and the second side being parallel and arranged on opposite sides of the plate, and a front side and a rear side, wherein the first side, the second side, the front side, and the rear side delimit a plate area, and wherein when an array of such plates is being transported along the transport path, the rear side of a first plate is adjacent the front side of a subsequent plate, wherein the arrangement comprises:
   a conveyor along the first side of the plate for conveying the plates along the transport path; and
   an aligner arranged along the transport path of the array of plates, wherein the aligner or a part of the aligner is movable relative to the transport path from a first position where the aligner is disengaged with the array of plates to a second position where the aligner is in engagement with at least one or part of one side of one of the plates in the array of plates,
   wherein the array of plates when being aligned remains in the substantially horizontal plane of the transport path; and
   wherein, in the second position, the aligner moves in the same direction and speed as plates travelling on the transport path.

2. The arrangement according to claim 1, wherein the transport path where the aligner is arranged is linear, wherein the aligner is moved orthogonal to the transport path.

3. The arrangement according to claim 1, wherein the aligner is arranged on a movable structure, which movable structure is movable e in a direction of the transport path from a first aligner position to a second aligner position.

4. The arrangement according to claim 1, wherein the conveyor is configured for moving the array of plates stepwise/sequentially or continuously.

5. The arrangement according to claim 1, wherein the second side of the plates, is provided with indentations spaced with a mutual distance X along the second side, and where the aligner is provided with protuberances that correspond to the indentations and are mutually spaced the same distance X.

6. The arrangement according to claim 1, wherein the second side of the plates, is provided with at least one indentation arranged a pre-determined distance from the front side of the plate, and wherein the aligner is provided with at least one protuberance congruent to the at least one indentation.

7. The arrangement according to claim 5, wherein the indentations and the protuberances in the plane of the plate are semi-circles, triangles, rectangles, or polygonal.

8. The arrangement according to claim 1, wherein the second side of the plate and distanced from the second side edge towards the first side are provided one or more apertures in the plate area.

9. The arrangement according to claim 1, wherein a mechanical return mechanism is provided in order to assure that the aligner is moved away from the second side allowing the plate to travel along the transport path, the mechanical return mechanism comprising one or more oblique surfaces orthogonal to the plane of the plates and arranged at an oblique angle relative to a direction of the transport path, wherein the closest part of the oblique surface is upstream relative to the transport path, and one or more engagement pegs extending such that they engage the oblique surface, such that when the aligner moves in the direction of the transport path, at least one engagement peg will engage one oblique surfaces whereby the aligner is urged away from the second side.

10. The arrangement according to claim 5, wherein the aligner comprises an endless belt or a wheel, wherein one or more protuberances extends from the periphery of the belt or wheel, and where, if more than one protuberance is provided the protuberances are evenly spaced with the mutual fixed distance X, wherein the belt or wheel may rotate such that the one or more protuberance(s) move in the same direction and speed as plates travelling on the transport path, and wherein the protuberance(s) arrive at the second position, such that the protuberances engages one or more indentations in at least one plate.

11. The arrangement according to claim 1, wherein the aligner, in the second position, is in contact with at least two adjacent plates.

12. The arrangement according to claim 1, wherein an actuator is provided for moving the aligner relative to the transport path, from said first position to said second position and back again.

13. The arrangement according to claim 8, wherein two or more apertures are provided with a mutual distance Y in the direction of the transport path in the plate area.

14. The arrangement according to claim 8, wherein the aligner has a web extending below the plates in the transport path, wherein said web is provided with one or more spikes and if more than one spike is provided they are provided spaced a distance Y in the transport path direction, said spikes extending upwards towards the plates, and wherein the aligner with the web may be moved such that the one or more spikes penetrates the one or more apertures on at least one plate.

15. The arrangement of according to claim 1, wherein the plate is aligned relative to a fixed line.

16. The arrangement of claim 1, wherein the plates are configured for carrying of ice cream.

17. The arrangement according to claim 1, wherein the second side of the plates, is provided with at least one protuberance arranged a pre-determined distance from the front side of the plate, and wherein the aligner is provided with at least one indentation corresponding to the at least one protuberance.

\* \* \* \* \*